(12) United States Patent
Peaslee et al.

(10) Patent No.: US 7,618,582 B2
(45) Date of Patent: Nov. 17, 2009

(54) CONTINUOUS STEEL PRODUCTION AND APPARATUS

(75) Inventors: Kent D. Peaslee, Rolla, MO (US); Jörg J. Peter, McMinnville, OR (US); David G. C. Robertson, Rolla, MO (US); Brian G. Thomas, Champaign, IL (US); Lifeng Zhang, Trondheim (NO)

(73) Assignees: The Curators of the University of Missouri, Rolla, MO (US); The Board of Trustees of the University of Illinois, Urbana, IL (US)

( * ) Notice: Subject to any disclaimer, the term of this patent is extended or adjusted under 35 U.S.C. 154(b) by 356 days.

(21) Appl. No.: 11/381,820

(22) Filed: May 5, 2006

(65) Prior Publication Data

US 2006/0272447 A1 Dec. 7, 2006

Related U.S. Application Data

(60) Provisional application No. 60/678,833, filed on May 6, 2005.

(51) Int. Cl.
 *C21C 5/56* (2006.01)
 *C21C 7/076* (2006.01)
(52) U.S. Cl. ............... 266/215; 75/500; 75/507; 75/957
(58) Field of Classification Search ..... 75/10.62–10.63, 75/957, 433, 500, 507; 266/201, 215, 216; 164/418; 423/153–154
 See application file for complete search history.

(56) References Cited

U.S. PATENT DOCUMENTS

| | | | | | |
|---|---|---|---|---|---|
| 3,752,663 | A | * | 8/1973 | Worner | 75/10.42 |
| 3,865,579 | A | * | 2/1975 | Williams | 75/530 |
| 4,564,388 | A | * | 1/1986 | Vallomy | 75/10.12 |
| 4,615,511 | A | * | 10/1986 | Sherwood | 266/208 |
| 4,665,701 | A | * | 5/1987 | Bach | 60/547.1 |
| 6,155,333 | A | * | 12/2000 | Vallomy | 164/476 |
| 6,450,804 | B2 | | 9/2002 | Vallomy | |
| 6,699,302 | B1 | | 3/2004 | Jones et al. | |
| 2006/0272452 | A1 | * | 12/2006 | Ions | 75/500 |

OTHER PUBLICATIONS

DOE Final Technical Report 9DE-FC36-03ID14279, Development of a process to continuously melt, refine, and cast high quality steel, Jul. 28, 2006, p. 1-13 and 56-77.*
DOE pamphlet, Process to continuously melt, refine, and cast high quality steel, Sep. 2005.*
T. Jiemin et al, EAF technology evolution by continuous charging, Ironmaking and Steelmaking, vol. 32, No. 3, (2005), p. 191-194.*
B. Mishra—Ironmaking and steelmaking, in Metals handbook Desk Edition, (2000), 31 pages.*

(Continued)

*Primary Examiner*—George Wyszomierski
*Assistant Examiner*—Mark L Shevin
(74) *Attorney, Agent, or Firm*—Senniger Powers LLP

(57) ABSTRACT

A process for continuous refining of steel via multiple distinct reaction vessels for melting, oxidation, reduction, and refining for delivery of steel continuously to, for example, a tundish of a continuous caster system, and associated apparatus.

23 Claims, 10 Drawing Sheets

OTHER PUBLICATIONS

John A. Vallomy et al., "Continuous Steelmaking at Ori Martin of Brescia, Italy", AISE Steel Technology, May 2000, p. 35.

Robert J. Schmitt, "Electric Arc Furnace Scrap Preheating", TechCommentary, Apr. 1997, pp. 1-4, Carnegie Mellon Research Institute, Pittsburgh, Pennsylvania.

P. Argenta et al., "The EAF Technology Evolution and the Consteel System", La Metallurgia Italiana, Jan. 2005, 7 pages.

International Search Report, PCT/US2006/017424, dated May 2, 2007, 2 pages.

Peter, Peaslee, Robertson, Zhang, Thomas "Simulations of a New Continuous Steelmaking Process"; AISTech 2006 May 1, 2006.

Peter, Peaslee, Robertson, Zhang, Thomas "Introduction of a Novel, Scrap-based Fully Continuous Steelmaking Process"; AISTech 2005, May 9, 2005.

Peter, Peaslee, Robertson, Thomas "Experimental Study of Kinetic Process during the Steel Treatment at Two LMFs"; AISTech 2005, May 9, 2005.

Zhang, Aoki, Thomas, Peter, Peaslee, "Designing a New Scrap Based Continuous Steelmaking Process Using CFD Simulation", 3rd Internat. Congress on Science & Technology of Steelmaking, Charlotte, NC, May 9-11, 2005, Association for Iron & Steel Technology, Warrendale, PA, pp. 1-14.

Peter, Peaslee, Robertson "Review of Progress in Developing Continuous Steelmaking"; AISTech 2005, May 9, 2005.

Peter, Peaslee, Robertson "Study of Current Steelmaking Practices to Evaluate the Viability of Continuous Steelmaking"; AISTech 2004, Sep. 15, 2004.

Abstract; Peter, Peaslee, Robertson, Zhang, Thomas "Simulations of a New Continuous Steelmaking Process"; Iron & Steel Technology, Feb. 18, 2006.

Abstract; Peter, Peaslee, Robertson, Zhang, Thomas "Introduction of a Novel, Scrap-based Fully Continuous Steelmaking Process"; Iron & Steel Technology, Feb. 18, 2005.

Abstract, Peter, Peaslee, Robertson, Thomas "Experimental Study of Kinetic Process during the Steel Treatment at Two LMFs"; Iron & Steel Technology, Feb. 18, 2005.

Abstract, Zhang, Aoki, Thomas "Designing a New Scrap-based Continuous Steelmaking Process Using CFD Simulation"; Iron & Steel Technology, Feb. 18, 2005.

Aoki, Zhang, Thomas, "Modeling of Inclusion Removal in Ladle Refining"; 3rd Internat. Congress on Science & Technology of Steelmaking, Charlotte, NC, May 9, 2005, Association for Iron & Steel Technology, Warrendale, PA, pp. 319-332.

Aoki, Thomas, "Experimental and Theoretical Investigation of Mixing in a Bottom Gas-Stirred Ladle"; AISTech 2004, Nashville, TN, Sep. 15-17, 2004, Association for Iron Steel Technology, Warrendale, PA, pp. 1-12.

Peter, J., Peaslee, K.D. and Robertson, D.G.C., "Review of Progress in Developing Continuous Steelmaking," Iron & Steel Technology, vol. 2, No. 2, Feb. 2005.

Peter, J., Peaslee, K.D., and Robertson, D.G.C., "Review of Progress in Developing Continuous Steelmaking," AISTech 2004 Proceedings, vol. I, 2004, pp. 869-880 (Presented Sep. 2004, Nashville, TN).

Zhang, L., Aoki, J., and Thomas, B.G., "Inclusion Removal by Bubble Flotation in Continuous Casting Mold," MS&T 2004 Proceedings, 2004, pp. 161-177. (Presented Sep. 2004, New Orleans, LA).

* cited by examiner

CONTINUOUS STEEL PRODUCTION AND APPARATUS

CROSS-REFERENCE TO RELATED APPLICATIONS

This application claims the benefit of U.S. Provisional Application Ser. No. 60/678,833, filed May 6, 2005, the entire content of which is hereby incorporated herein by reference.

STATEMENT OF GOVERNMENT INTEREST

This invention was made with government support by the Department of Energy under cooperative agreement number DE FC36-03ID14279. The government has certain rights in the invention.

FIELD OF THE INVENTION

This invention relates to a method for continuously producing steel by integrated and continuous melting, refining, and delivering steel to, for example, a tundish of a continuous caster.

BACKGROUND OF THE INVENTION

A number of processes have been proposed for continuous production of steel dating back to the 1860s. "Continuous" in this context has been used to describe processes which semi-continuously charge hot metal or scrap and deslag while periodically tapping steel into ladles. It has been used to describe processes which continuously utilize various vessels while continuously tapping steel into ladles, though in certain aspects there are interruptions somewhere in the melting, refining, or transporting operations. And it has been used to describe fully continuous processes which continuously transport steel from melting, through refining, to molding in a continuous caster without interruption in the flow of steel.

Continuous steelmaking processes have not received general acceptance in the industry because they could not compete with conventional steelmaking technology. Frequent improvements in basic oxygen furnaces (BOFs), electric arc furnaces (EAFs), ladle metallurgy furnaces (LMFs), and other secondary treatment facilities have provided production and quality flexibility perceived as more profitable than commercialization of new and risky continuous steelmaking processes which have been proposed, although some processes have been extensively tested.

Processes that resemble non-equilibrium CSTRs or PFRs in certain respects have suffered from lack of control and failure to promise substantially lower meltshop costs than conventional batch operations. Most of these processes have been designed to continuously utilize the equipment and to perform one major refining step (e.g., desulfurization) while tapping steel into a ladle as practiced in batch operations. The utilization of most batch reactors is close to one hundred percent, eliminating substantially any advantage of processes that are not fully continuous and do not completely prepare the steel for introduction to continuous casters.

A large number of continuous steelmaking processes were introduced in the 1960s just after the peak of the open hearth furnace (OHF) process and during the time of rapid BOF development and growth. The number of new continuous steelmaking processes declined after the 1960s as BOF and EAF steelmaking processes were optimized and improved through the introduction of LMFs. Today, BOF, EAF, and LMF are mature technologies operating close to optimum, allowing for only marginal future improvements in these processes. A major decrease in meltshop costs is therefore only possible with new, revolutionary processing.

U.S. Pat. No. 6,155,333 describes a scrap-based process which continuously charges scrap and continuously operates at near-equilibrium steady state conditions during melting, decarburization, and dephosphorization. However, the overall process is only semi-continuous because periodic tapping of the furnace interrupts the overall steady state operation.

In order to offset risks of investing in new technology, a new steelmaking process needs to have a potential to significantly reduce meltshop costs, and be reliable. There is a need, therefore, for a fully continuous process which can produce high quality steel at significantly lower cost with sufficient reliability and benefits to justify commercialization.

SUMMARY OF THE INVENTION

Briefly, therefore, the invention is directed to an apparatus for continuous refining of steel comprising a melting furnace, for melting iron-bearing material into molten metal, the furnace comprising a heat source, a melting furnace inlet for continuously receiving the iron-bearing material, a melting vessel in communication with said inlet for melting the iron-bearing material into molten metal and holding the molten metal, and a melting furnace outlet for discharging the molten metal continuously from the melting vessel simultaneously with the melting furnace inlet's continuously receiving the iron-bearing material; an oxidizer for oxidizing oxidizable elements in the molten metal, the oxidizer having a chemically oxidizing environment and comprising an oxidizer inlet for continuously receiving molten metal discharged from the melting furnace outlet, an oxidizing vessel in communication with the oxidizer inlet for holding molten metal, and an oxidizer outlet for continuously discharging the molten metal from the oxidizer simultaneously with the oxidizer inlet's continuously receiving the molten metal discharged from the melting furnace outlet; and a reducer for deoxidizing and desulfurizing the molten metal, the reducer having a chemically reducing environment and comprising a reducer inlet for continuously receiving the molten metal discharged from the oxidizer outlet, a reducer vessel in communication with the reducer inlet for holding molten metal, and a reducer outlet for continuously discharging the molten metal from the reducer simultaneously with the reducer inlet's continuously receiving the molten metal discharged from the oxidizer outlet.

In another aspect, the invention is directed to a process for continuous refining of steel comprising continuously feeding iron-bearing material into a melting furnace and melting the iron-bearing material into molten metal therein, wherein the melting furnace comprises a heat source, a melting furnace inlet for continuously receiving the iron-bearing material, a melting vessel in communication with said inlet for melting the iron-bearing material into the molten metal and holding the molten metal, and a melting furnace outlet; discharging the molten metal continuously through the melting vessel outlet simultaneously with the melting furnace inlet's continuously receiving the iron-bearing material; continuously receiving the molten metal discharged through the melting vessel outlet into an oxidizer for oxidizing oxidizable elements in the molten metal, the oxidizer having a chemically oxidizing environment and comprising an oxidizer inlet for the continuously receiving molten metal discharged through the melting furnace outlet, an oxidizing vessel in communication with the oxidizer inlet for holding molten metal, and an oxidizer outlet; oxidizing oxidizable elements in the molten metal in the oxidizer vessel; discharging the molten metal continuously through the oxidizer vessel outlet simultaneously with the oxidizer inlet's continuously receiving the molten metal discharged through the melting furnace outlet; continuously receiving the molten metal discharged from the oxidizer vessel outlet into a reducer for deoxidizing and desulfurizing the molten metal, the reducer having a chemically reducing environment and comprising a reducer inlet for continuously receiving the molten metal discharged through the oxidizer outlet, a reducing vessel in communication with the reducer inlet for holding molten metal, and a reducer outlet; and discharging the molten metal continuously through the reducer vessel outlet simultaneously with the reducer inlet's continuously receiving the molten metal discharged through the oxidizer outlet.

Other objects and features of the invention will be in part apparent and in part pointed out hereinafter.

DETAILED DESCRIPTION OF PREFERRED EMBODIMENTS

The present invention is based on the incorporation into steelmaking of near-equilibrium CSTRs. The reduction of the necessary chemical conversion by using scrap or other low-impurity, iron-based material, coupled with the improvements in the chemical conversion possible by using a series of near-equilibrium CSTRs, improve the possibility of economic continuous operation. Tundish operations which feed the continuous caster are improved with a continuous, steady, and reliably consistent supply of steel from the three vessels that resemble near-equilibrium CSTRs.

The apparatus and process of the present invention are designed to replace steelmaking operations which employ an EAF, LMF, and continuous caster. The process allows for substantial variation in production rate such as between about 30 t/hr and about 220 t/hr. The process can operate for one week or longer without interruption of steel production and with an expected weekly maintenance downtime on the order of 8 to 12 hours.

Figure 1:
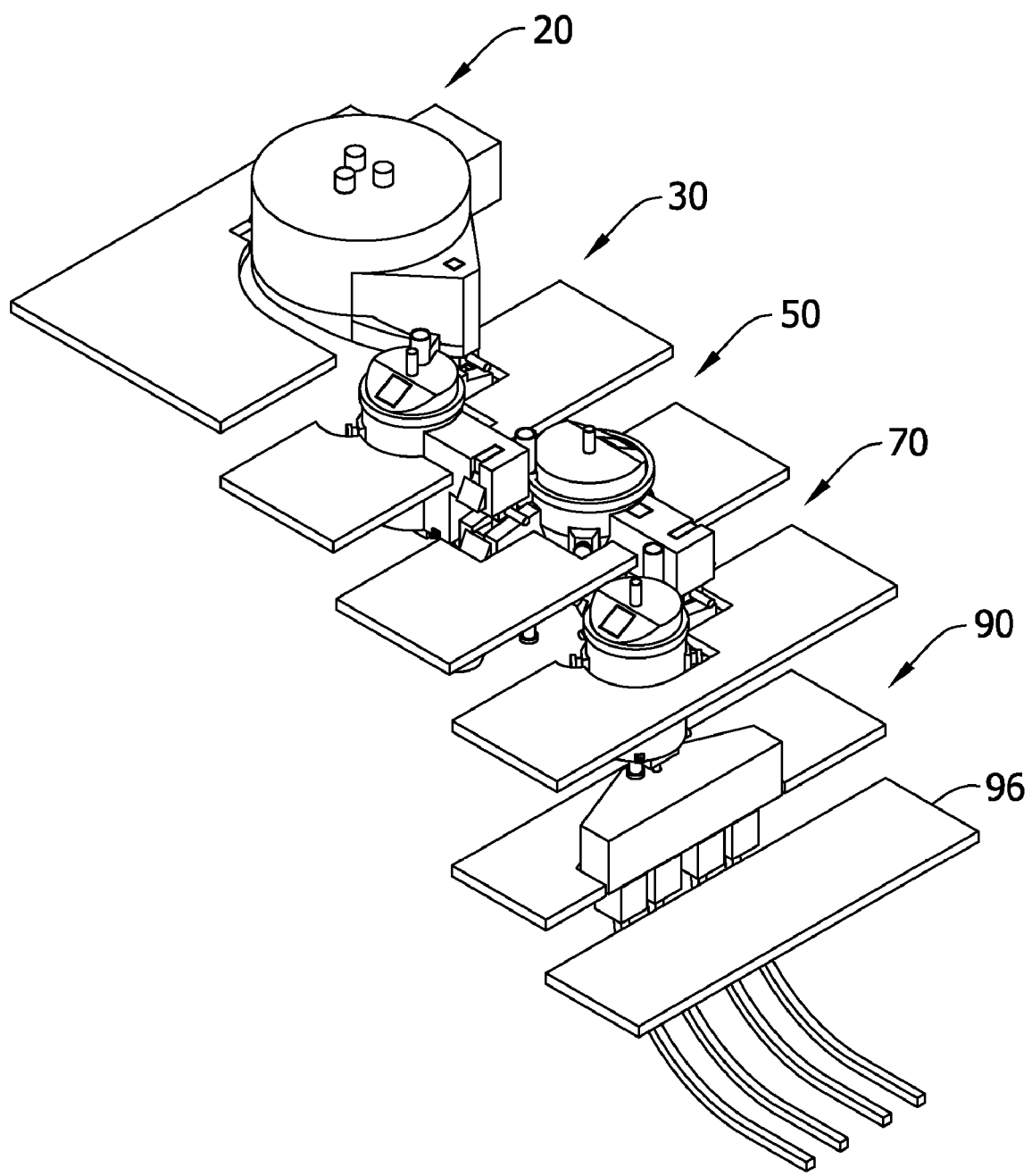
FIG. 1 is a perspective view of the steelmaking apparatus of the invention.

Turning to FIG. 1, the apparatus comprises five interconnected vessels including in sequence a melting furnace 20, an oxidizer 30, a reducer 50, a finisher 70, and a tundish 90. Scrap is continuously charged to and melted in the melting furnace, which is a modified Consteel® AC EAF. The scrap is preheated in the Consteel® conveyor. In one embodiment the furnace charge is delivered to the furnace as described in U.S. Pat. No. 6,450,804, the entire disclosure of which is expressly incorporated herein by reference. In the melting furnace melting is achieved with electrical energy and chemical energy from exothermic reactions such as the combination of C and O to form CO, the oxidation of Al to alumina, and other oxidation reactions. Preliminary decarburization and dephosphorization are performed in the melting furnace 20 while a foamy slag is maintained. Further decarburization and dephosphorization are performed in the oxidizer 30. Near-equilibrium conditions allow for just partial deoxidation in the oxidizer, if desired, depending on the target carbon concentration. In the reducer 50 the molten metal is continuously deoxidized, desulfurized, and optionally alloyed. In the finisher 70 the molten metal is subject to final trimming, additional desulfurization, inclusion flotation, and homogenization. From the finisher 70 the molten metal flows continuously into the tundish 90, which continuously feeds the continuous caster. The discharge from the finisher is optionally suitable for steel casting operations which do not involve a tundish and continuous caster. Oxidizing conditions are maintained in the melting furnace and oxidizer; and reducing conditions are maintained in the reducer and finisher.

The series of oxidizer 30 and reducer 50 reactors with similar near-equilibrium conditions allows for optimum refining and for minimization of variations in fluid flow (residence time distributions) and composition (chemistry, inclusion concentration). This contributes to the reliability and flexibility of the process. The sequential refining and near-equilibrium, steady-state operation of the process allows for increased refining. It also allows for reduced alloy consumption and flux consumption in comparison to EAF-LMF processes. For instance, it is predicted that no oxidizing slag would carry over in vessels with reducing slag, as it is currently experienced during the tapping of furnaces.

Figure 2:
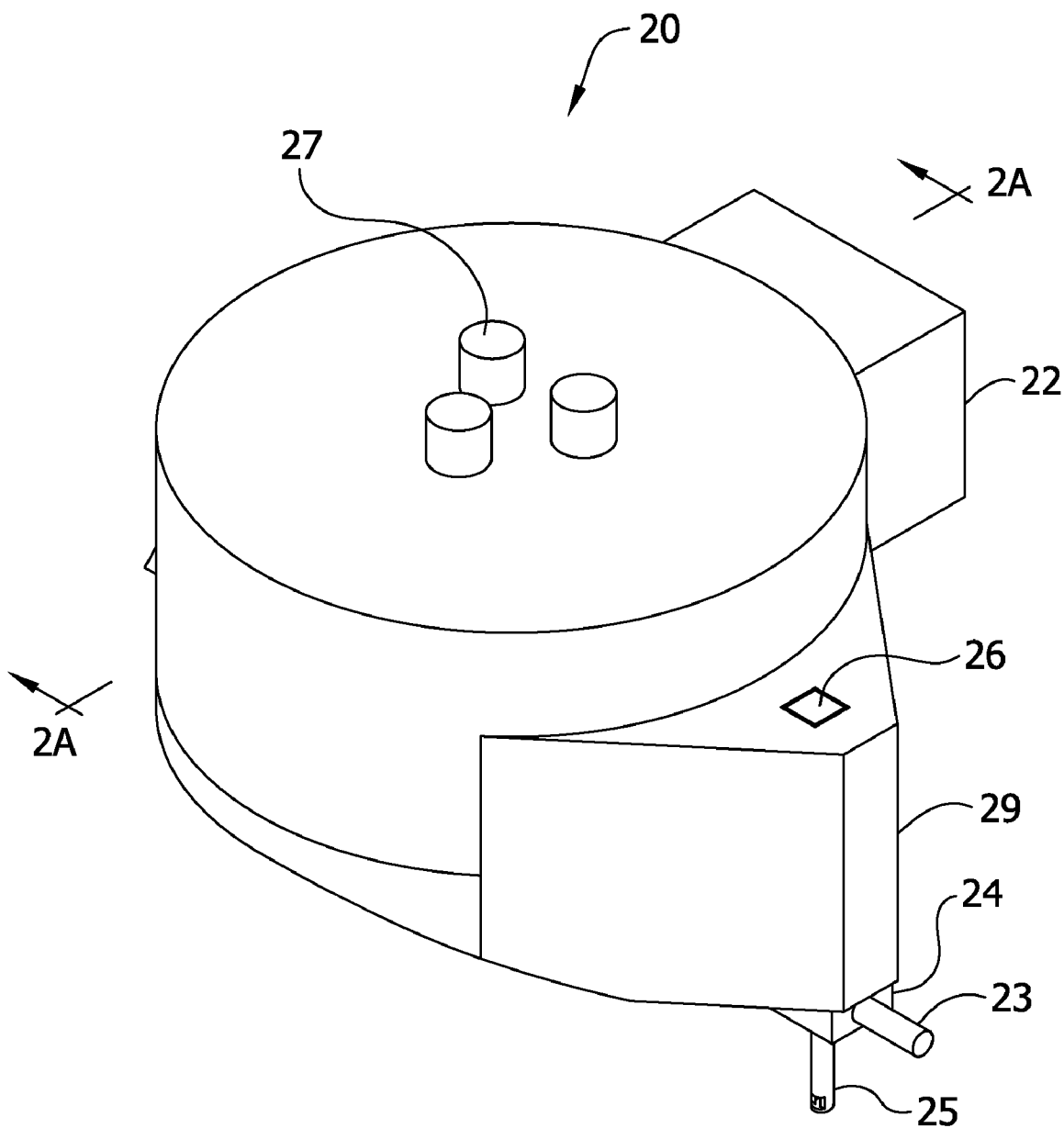
FIG. 2 is a perspective view of a melting furnace component of the apparatus.
Figure 2A:
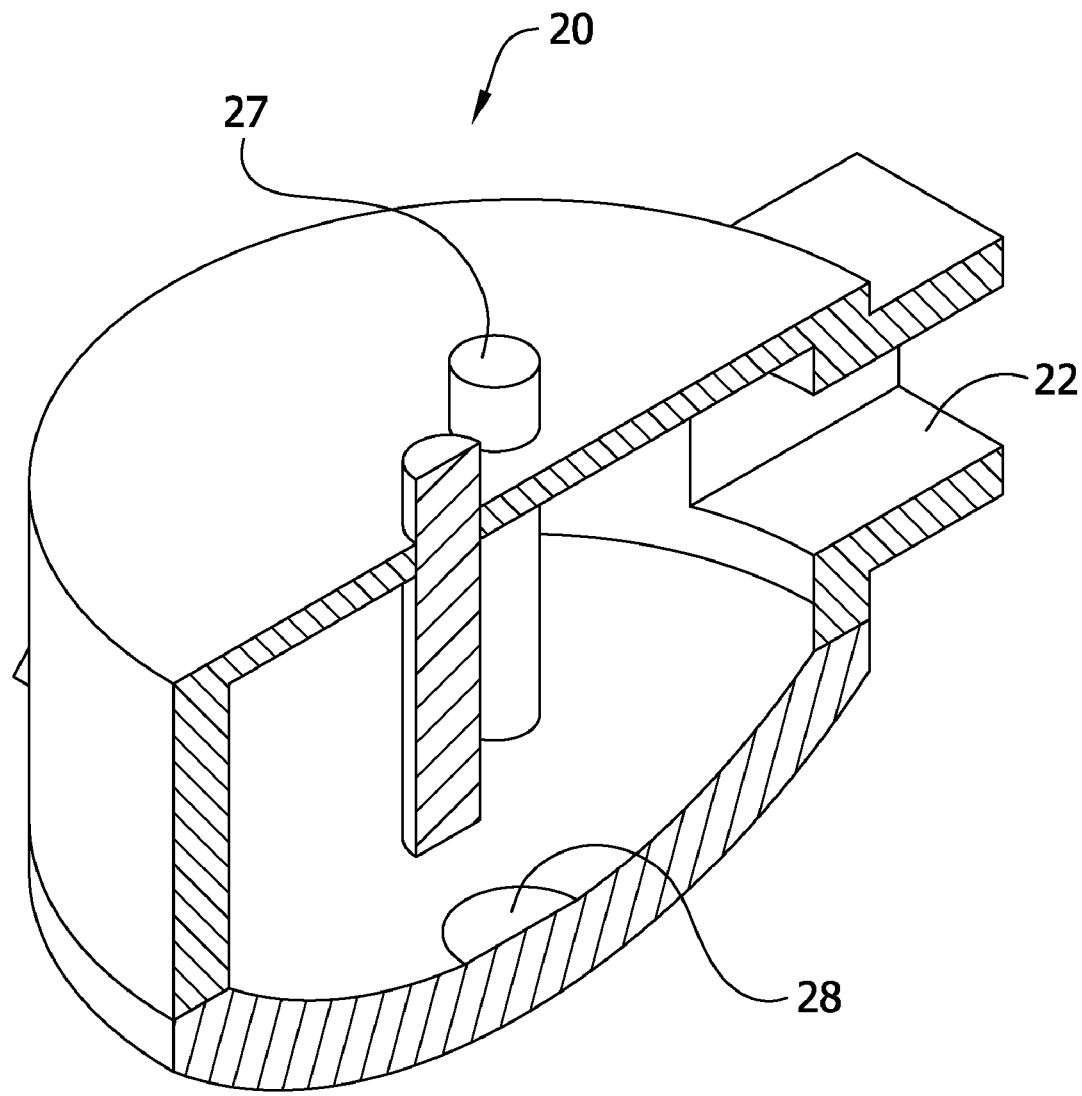
FIG. 2A is a section view taken along line 2A-2A.

With respect to the melting furnace, in a preferred embodiment it is a modified version of the EAF depicted in FIGS. 10 and 11 of U.S. Pat. No. 6,155,333, the entire disclosure of which is expressly incorporated herein by reference. As shown in FIGS. 2 and 2A, the melting furnace 20 is equipped with an eccentric bottom tapping (EBT) bottom tap unit 29 including melting furnace outlet 25 positioned so that it is level with the lowest point 28 of the furnace vessel, as indicated. There is a constant material fill height between about two and about four feet, though all units are shown empty here. These features eliminate or substantially eliminate carry-over slag during steady-state operation, and allow for complete draining of the melting furnace into the oxidizer without tilting the furnace vessel. Flow of molten material out of the melting furnace is through a melting furnace outlet 25, here shown having a shroud and a side port. Flow is regulated, preferably by a slide gate 24 having hydraulic piston 23. There are also electrodes 27 and EBT maintenance door 26. The inner diameter of the melting furnace vessel is between about 10 and about 15 feet. In one preferred embodiment the melting furnace vessel has a constant material fill height of about 2.3 feet and an inner diameter of about 13.8 feet.

Scrap and flux are charged continuously into the EAF through melting furnace inlet 22, which communicates with a conveyor system (not shown). Direct reduced iron (DRI) or other scrap substitutes may also be used in addition to or instead of scrap, or a partial charge of hot metal as it is practiced with some EAF furnaces. The charge to the melting furnace in some applications, but not all applications, has a carbon content of less than 0.5%, preferably less than about 0.3%. The scrap and flux are preferably preheated to reduce the required size of the vessel by minimizing electrical energy requirements. Molten metal is continuously tapped from the bottom via outlet 25. By charging and tapping continuously, the furnace is operable in 100% power-on condition with a constant full furnace. For example, in one preferred embodiment there is a constant 55-ton liquid heel. The power supply is preferably AC to avoid the need for a bottom electrode.

Figure 3:
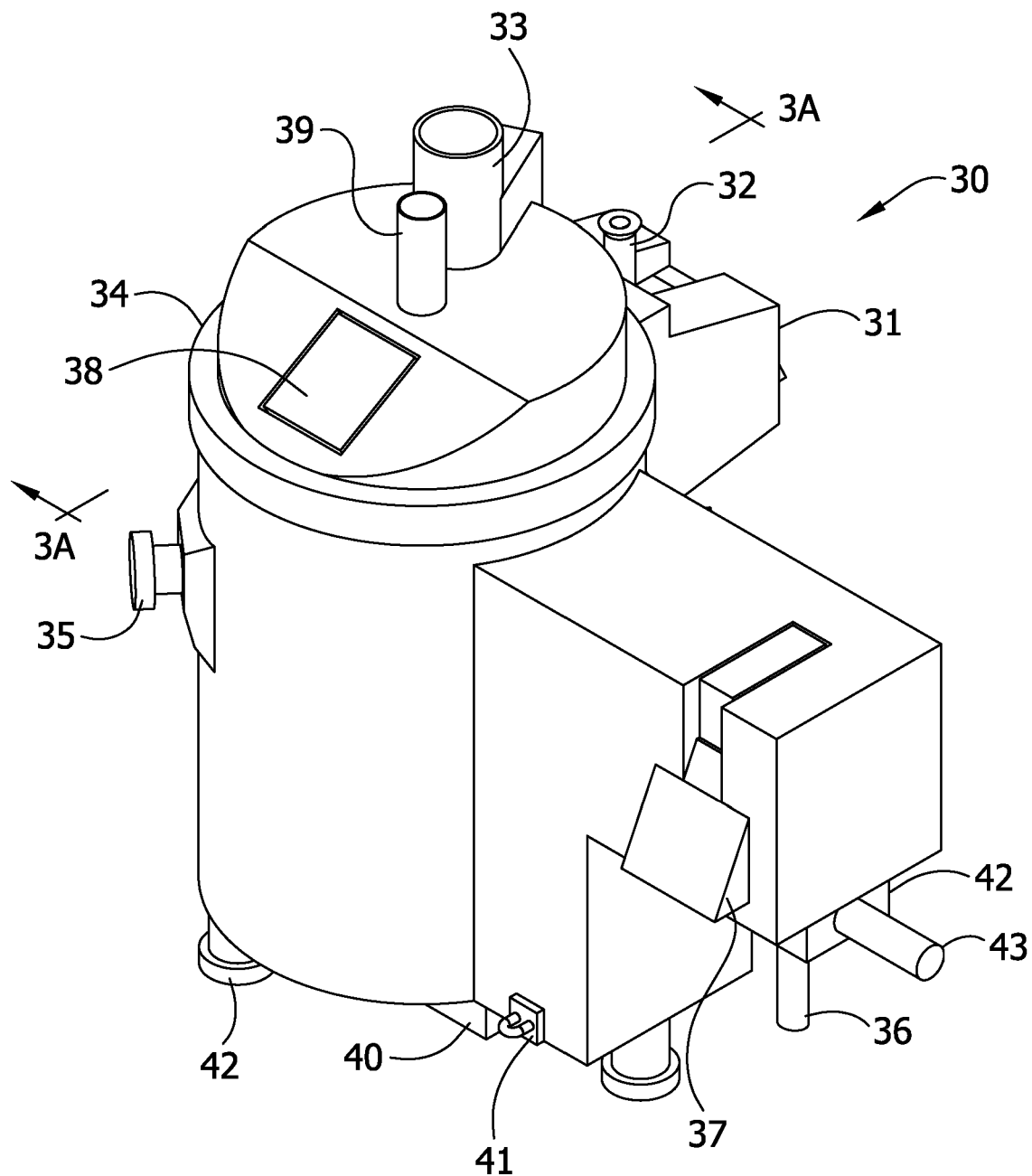
FIG. 3 is a perspective view of an oxidizer component of the apparatus.
Figure 3A:
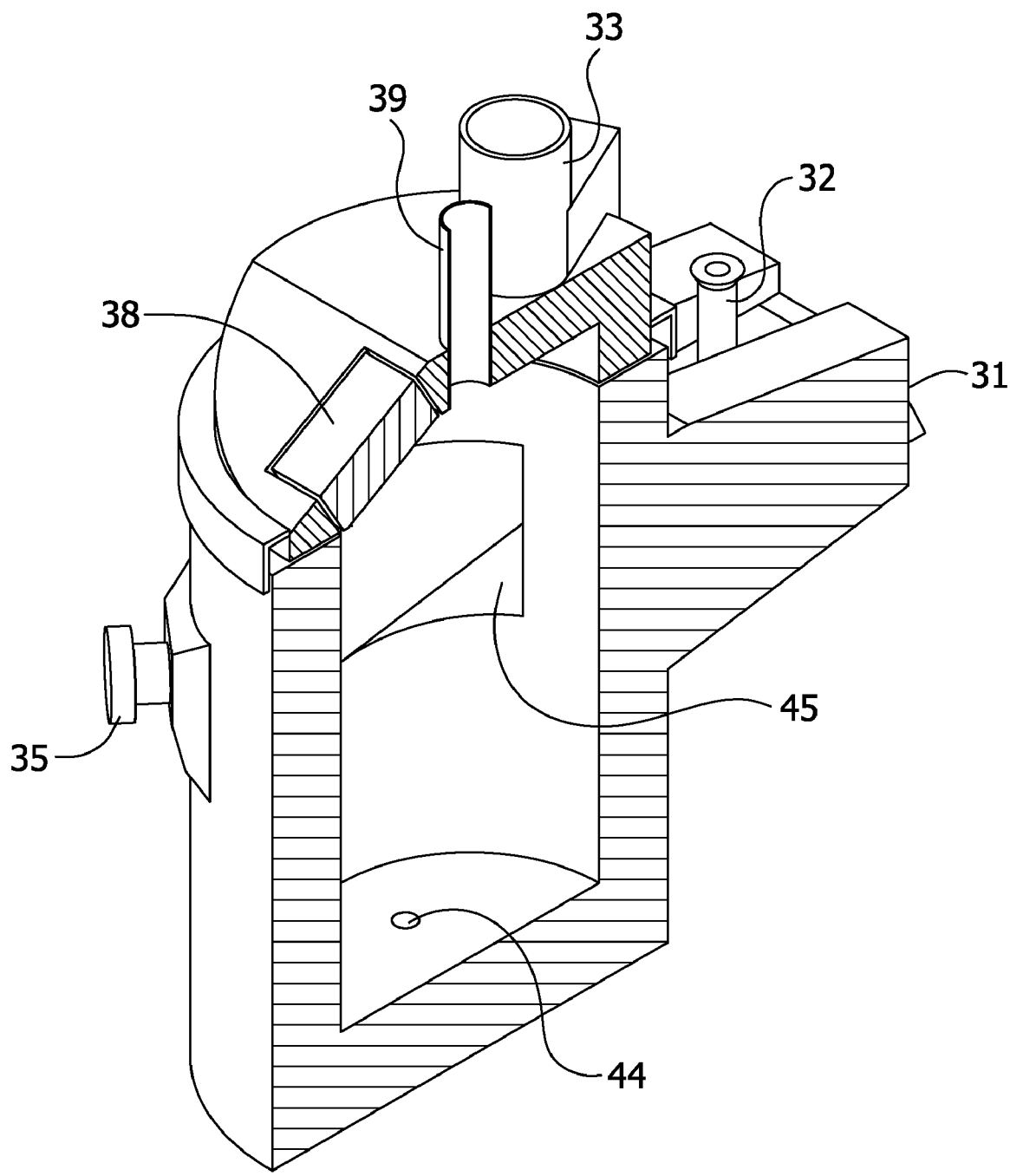
FIG. 3A is a section view taken along line 3A-3A.

The oxidizer 30 shown in FIGS. 3 and 3A performs additional decarburization and dephosphorization. It has an inside diameter of between about 4 and about 6 feet; 4.9 feet in the preferred embodiment, with a 27-ton capacity. Steel enters through an oxidizer inlet 32 and associated inlet chute 31, which in the preferred embodiment is 1.3 ft wide by 4 feet long. Entrance 45 in communication with chute 31 is located off-center to the oxidizer vessel, to produce a swirl in the steel bath and minimize risk of short-circuiting, i.e., of material passing directly from the oxidizer inlet system to the oxidizer outlet 36 without sufficient residence time in the vessel to be refined and homogenized with the vessel contents. The depth of the bath is between about 4 and about 7 feet; about 5.4 feet in the preferred embodiment. There is between about 3 and about 5 feet of free space above the bath; 3.7 feet in the preferred embodiment. The bath is stirred by injecting argon through plugs 44 (only one of three shown here) on the bottom of the vessel. The preferred embodiment employs three plugs to ensure constant and homogenous stirring even if one plug fails. The plugs are porous and produce small bubbles, promoting degassing reactions and the flotation of inclusions as well as increasing the gas/steel interface.

The oxidizer 30 has an oxidizer outlet 36 associated with an outlet chute (not shown) which in the preferred embodiment is 1.3 feet wide and 5.5 feet long. There are accompanying slide gate 42 and hydraulic piston 43. Outlet 36 is located so as to remove steel from the oxidizer vessel near the bottom to reduce risks of short circuiting and slag carryover. Less height is required than if the oxidizer outlet 36 were on the bottom of the vessel. For emptying the vessel for maintenance, if need be, there is an emergency slide gate 40. Or the steel can be poured through the oxidizer inlet chute 31 by removing and tilting the vessel with a crane. Hooks 41 and trunnions 35 and similar features of this and other vessels are used for this purpose. The oxidizer is supported by legs 42.

The inward stream of steel within the oxidizer inlet chute 31 creates an outward flow of slag on the upper surface. Spent slag is continuously removed at the oxidizer inlet, for example, via the oxidizer inlet chute 31 by this outward flow, and is optionally mechanically assisted, such as by a rake or auger mechanism (not shown). Thus slag is continuously transported to an overflow and into a slag pot below the oxidizer inlet chute 31. It is directed there by the apron shown associated with inlet 31, similar to the apron 37 associated with the oxidizer outlet. Off-gases are evacuated through a duct 33 in a removable roof that rests on the main vessel. Duct 33 is in communication with rim 34 which encloses the upper lip of the oxidizer to minimize intake of atmospheric air during off-gassing. There is a door 38 in the roof that provides access for observation and maintenance. If desired, alloying elements and fluxes are delivered through the alloy chute 39 that is located above the center of the top surface.

Figure 4:
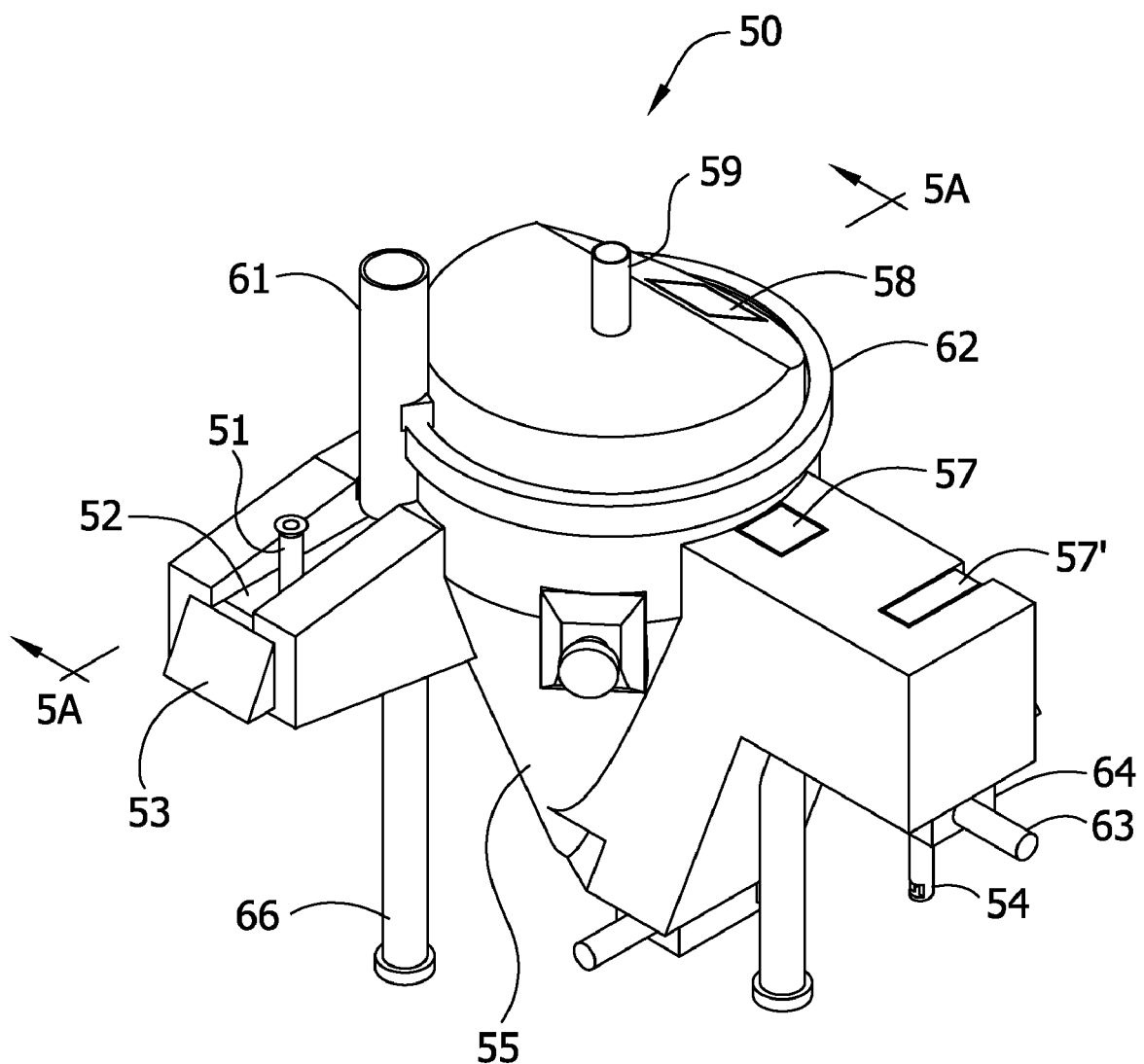
FIG. 4 is a perspective view of a reducer component of the apparatus.
Figure 4A:
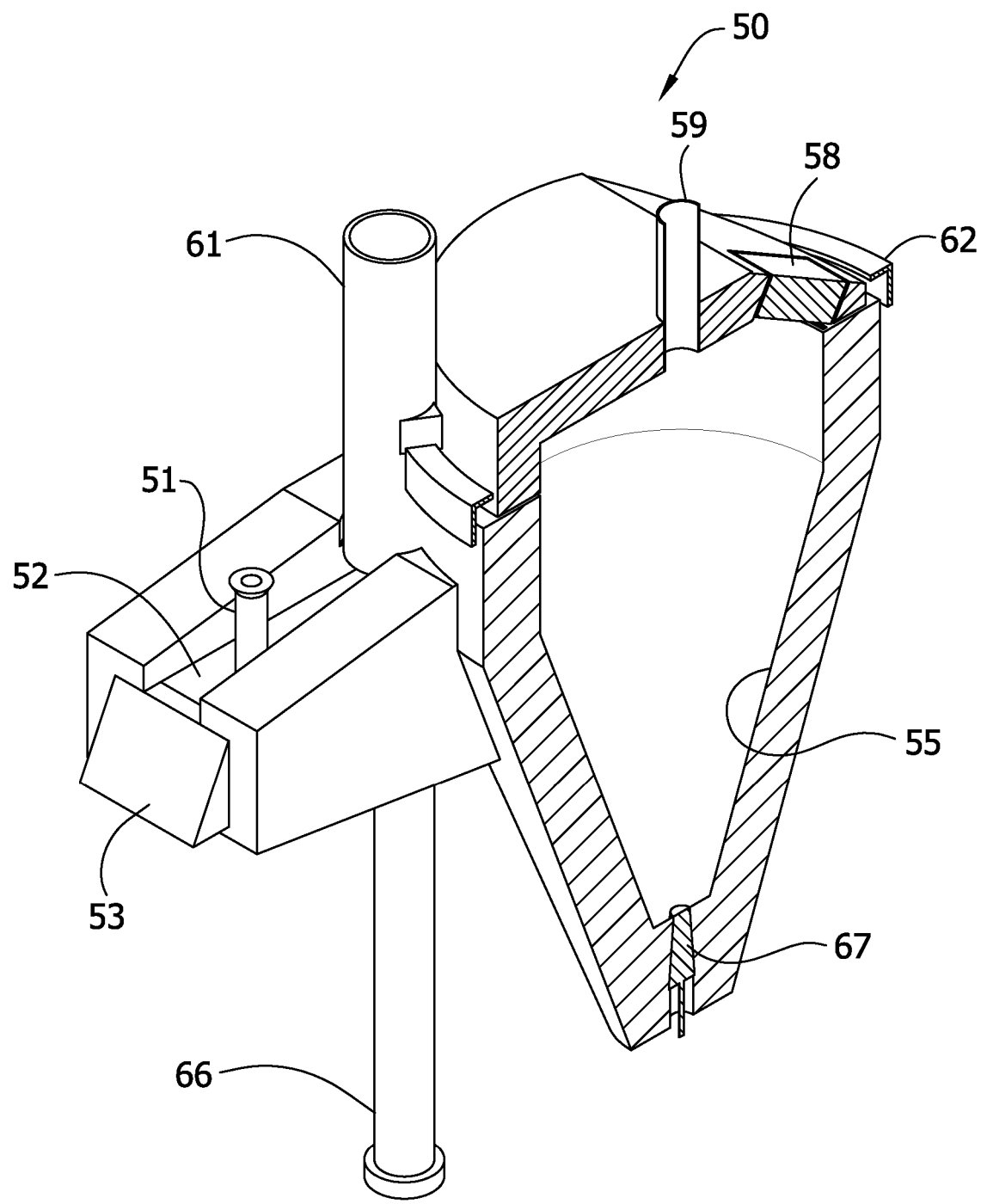
FIG. 4A is a section view taken along line 4A-4A.

The steel is then deoxidized, desulfurized, and alloyed in the reducer 50 illustrated in FIGS. 4 and 4A. Steel enters the reducer vessel via a reducer inlet 51 which, similar to the oxidizer inlet, has an associated inlet chute 52 which is off-center to impart swirling and enhance homogenization. Slag exits at the reducer inlet, for example, via the reducer inlet chute 52. The reducer vessel 55 has a conical shape with an upper inner diameter between about 3 and about 8 feet, a lower inner diameter between about 0.5 and about 3 feet, and an operating depth of about 5 to about 9 feet of steel, with about 3 to about 5 feet of free space above the steel level. In a preferred embodiment, the upper inner diameter is about 6.6 feet, the lower inner diameter is about 1.3 feet, the operating depth is about 7.2 feet, the free space is about 3.7 feet, and the top surface area of the steel bath about 34 ft$^2$, which is almost twice the top surface area in the oxidizer. The steel is stirred via argon through a porous plug 67 in the bottom of the vessel. The conical shape increases the fraction of the steel that is highly stirred, and increases the proportion of the steel in the vessel which is at the slag/metal interface in comparison to ladle vessels. This configuration maximizes the energy input into the steel, reaction rates, sulfur removal, temperature homogenization, chemistry homogenization, and production rates. The reducer outlet 54 has a shroud with a side port as shown, and is at the bottom of the reducer vessel 55. Access for inspection and maintenance is available through doors 57 and 57'. There is a slide gate 64 and hydraulic piston 63 for operation thereof. The reducer is supported by legs 66. There is continuous de-slagging through the reducer inlet chute 52 and associated apron 53 as with the oxidizer. There is a chute 59 for introduction of alloying elements and flux, and a door 58 for maintenance and observation. There is off-gas system 61 which preferably completely encloses the vessel roof joint around the sides via rim 62 to minimize pulling in of air from the surrounding atmosphere during release of off gas.

The oxidizer 30, reducer 50, and finisher 70 each has a vessel wall which is 16 inches thick in the preferred embodiment, allowing for placement of a 9-inch thick refractory lining, such as a resin-bounded magnesia refractory lining, a 2.5-inch back-up lining, and 2.5-inch thick insulating bricks, in addition to the structural support of a steel shell. The rest of the vessel is lined with a resin-bounded magnesia. The oxidizer vessel and reducer vessel each has a slag line lined with a magnesia-graphite refractory at the level of the slag in the vessel. These are low porosity materials to resist penetration. Refractory losses associated with thermal cycling, erosion, and corrosion are reduced as compared to ladle processes because consistent temperature and chemical conditions exist in each vessel. The elimination of frequent forceful tapping streams and cleaning of ladles with oxygen also reduces erosion and corrosion.

Figure 5:
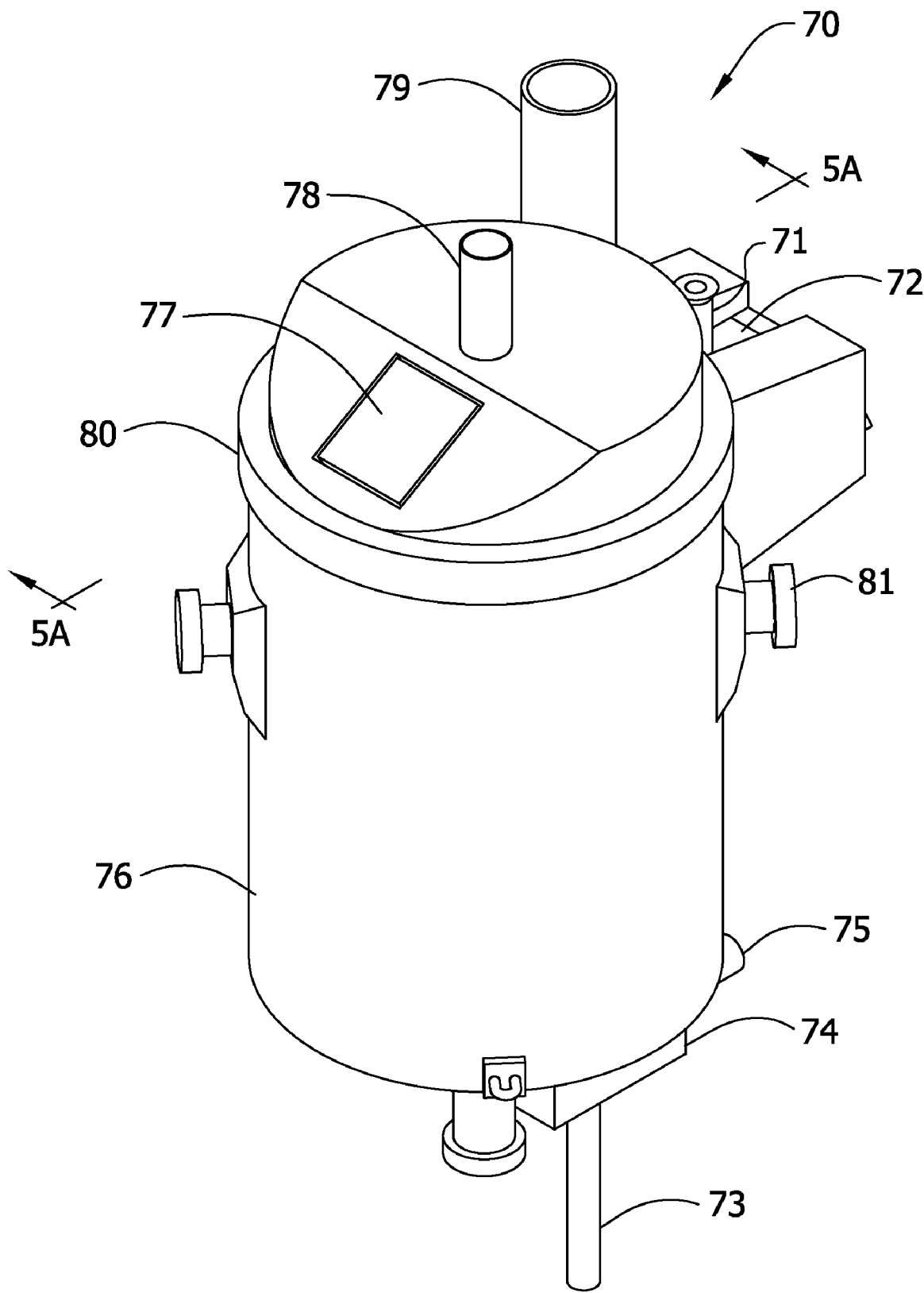
FIG. 5 is a perspective view of a finisher component of the apparatus.
Figure 5A:
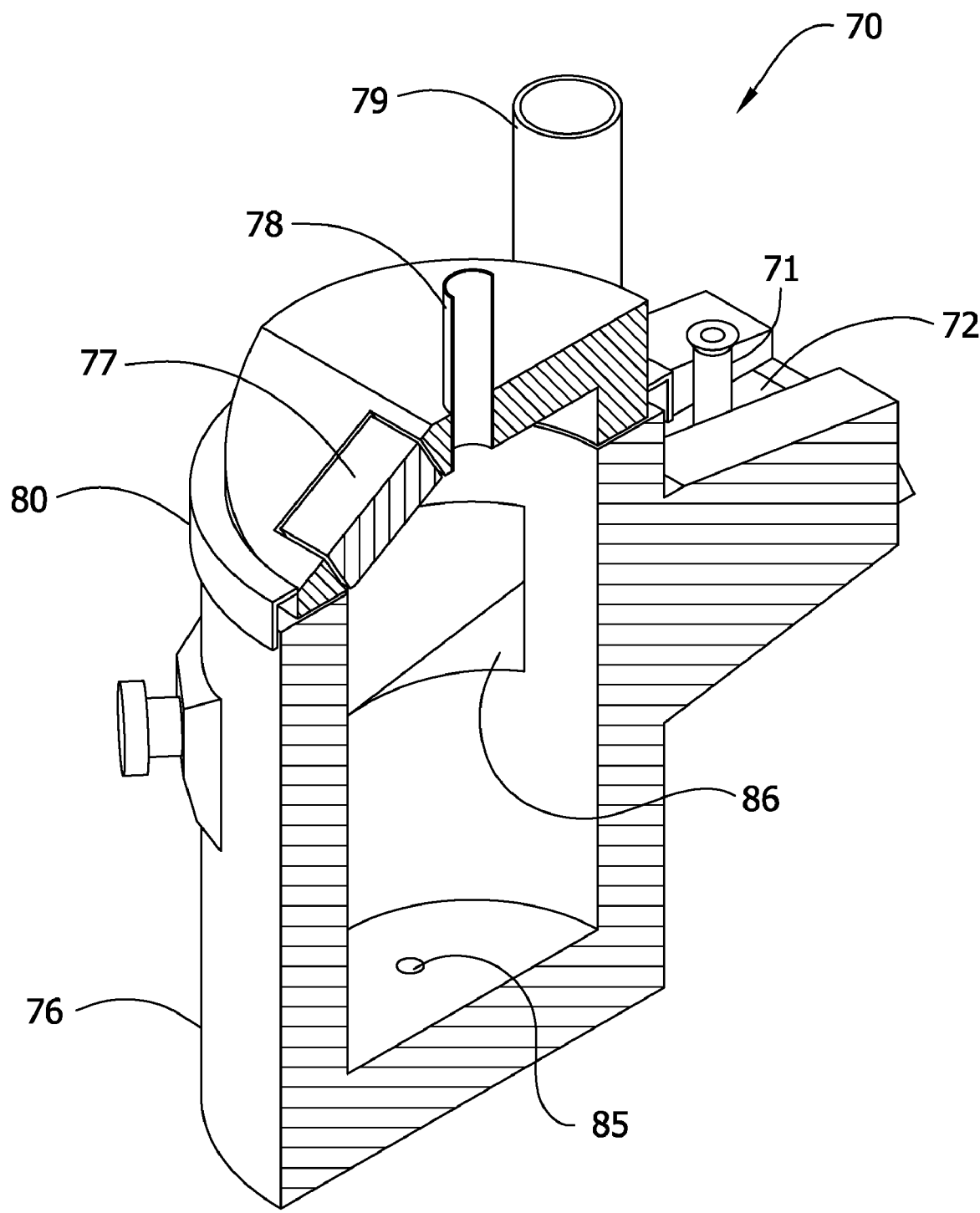
FIG. 5A is a section view taken along line 5A-5A.
Figure 6:
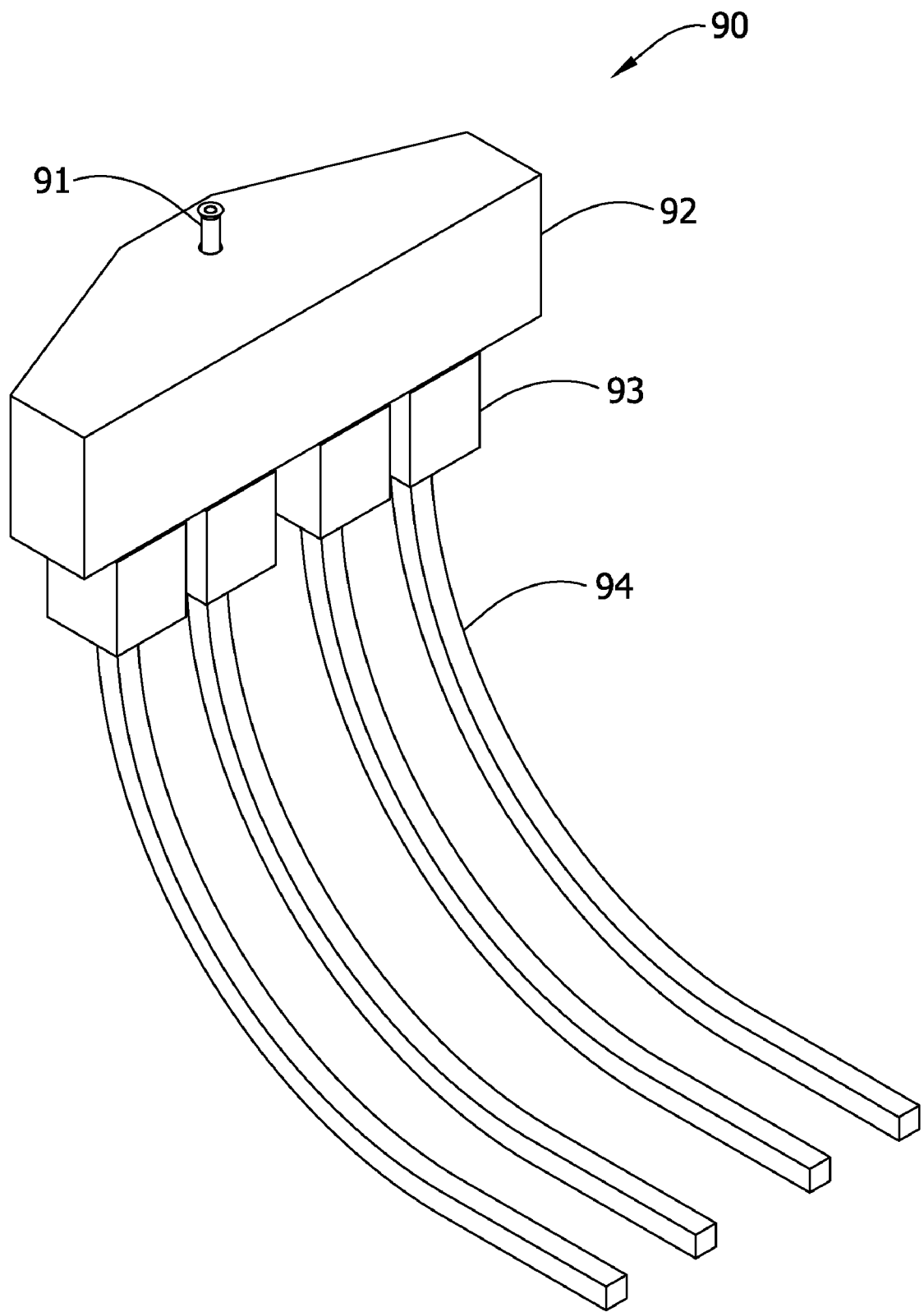
FIG. 6 is a perspective view of a tundish component of the apparatus.

Final alloying/trimming is accomplished in the finisher 70 shown in FIGS. 5 and 5A, as is some additional desulfurization. The finisher 70 is similar to the oxidizer 30. The finisher has finisher inlet 71 with associated inlet chute 72, and finisher outlet 73 with slide gate 74 and associated hydraulic piston 75. Slag exits at the finisher inlet, for example, via the finisher inlet chute 72. Entrance 86 in communication with chute 72 is off-center as with the oxidizer and reducer vessels. There is off-gas system 79 on the finisher vessel 76 similar to the off-gas system with the reducer, which preferably completely encloses the vessel roof joint around the sides via rim 80 so that introduction of air from the surrounding atmosphere is minimized during release of off gas. Steel is tapped through a bottom tap hole into the outlet 73, which allows for complete emptying of the finisher during grade changes. Trunnions 81 are available for transportation. Door 77 permits observation and maintenance access. Chute 78 is for alloy and flux additions. Porous plug 85 (one of, for example, three plugs) permits introduction of argon for stirring.

During normal operation, the steel bath level in the finisher remains constant, with continuous argon bubbling at a low flow rate, such as 7 scfm. This maximizes cleanliness, and chemistry and temperature homogeneity. Auxiliary heating of the steel during refining is not required during normal operation of the continuous steelmaking process because of the shorter residence time in comparison to other systems. For example, the average residence time for a segment of material in the entire system (entry furnace to exit tundish) is approximately one hour during a production (flow) rate of 150 t/hr. A non-contact twin plasma torch or the like can be used with access through the roof door if there are unexpected delays requiring heating.

There are slag pots and working platforms 96 (FIG. 1) associated with each of the three vessels. Each slag pot collects slag from one inlet chute and from the outlet chute of the previous vessel.

The operation of the melting furnace involves continuous loading of scrap onto the conveyor, continuous injection of carbon and oxygen, and continuous introduction of flux, to maintain a constant foamy slag with deslagging out the door. There is continuous tapping of steel into the oxidizer. After steel leaves the melting furnace 20 it cascades through the three refining components 30, 50, and 70 before entering the tundish 90, shown here as a delta tundish. Tundish 90 comprises inlet 91, tundish vessel 92, and molds 93, from which exit semi-finished steel billets 94. The treatment of the steel in each refining vessel includes periodic addition of fluxes to all vessels, and periodic addition of alloying elements at least to the finisher, and optionally to the reducer and oxidizer. The additions are, for example, every two to three minutes. There is continuous removal of slag into the slag pots. In the preferred embodiment, the slag pots hold approximately six tons of slag, such that they are replaced roughly every eight hours.

With respect to the tundish 90, it continually receives steel from the finisher, so there are no ladle changes. Advantageously, therefore, there are no ladle changes, no significant temperature fluctuations, and no significant molten metal level fluctuations. This decreases turbulence and reoxidation, and improves the cleanliness of the cast steel. Periodic or continuous temperature and chemistry measurements are taken, thus allowing sufficient time for corrective action.

Each of the five vessels works as a thermodynamic buffer due to near-equilibrium reactions, and the series of reactors provides an opportunity to offset variations through differentiated refining and alloying in each vessel.

During start-up, the oxidizer, reducer, finisher, and tundish are preheated, for example with natural gas burners. A bucket of scrap is charged directly to the melting furnace to have a liquid heel in place before scrap is transported by conveyor into the melting furnace. When the liquid level in the melting furnace reaches its operating height, the scrap supply is temporarily stopped to superheat the steel so the subsequent vessels can be filled without solidification of the steel therein. The melting furnace outlet slide gate is opened after the steel in the melting furnace is superheated, and steel flows into the oxidizer. After the oxidizer is filled, steel flow is stopped, if necessary, until the desired steel and slag chemistries are achieved in the oxidizer. The oxidizer outlet is then opened to fill the reducer and begin operation in a continuous mode. Once the reducer is filled, steel flow is halted again, if necessary, until the desired slag and steel chemistries are achieved in the reducer. The reducer outlet is then opened to fill the finisher. Once the finisher is filled, steel flow is again halted, if necessary, until the desired slag and steel chemistries are achieved in the finisher. The finisher exit is then opened and the exit to the tundish is opened to begin continuous operation of the entire system. Temperature can be adjusted as necessary in the reducer, finisher, and/or tundish during the start-up procedure, such as with a twin plasma torch.

During normal operation after start up, with reference to FIGS. 1-5, iron-bearing material is continuously fed into the melting furnace 20 and is melted into molten metal therein. The melting furnace inlet 22 continuously receives the iron-bearing material. Molten metal is continuously discharged through the melting vessel outlet 25 simultaneously with the melting furnace inlet's continuously receiving the iron-bearing material. Molten metal is discharged through the melting vessel outlet 25 into the oxidizer 30 for further refinement of the molten metal. The oxidizer has a chemically oxidizing environment and has the oxidizer inlet 32 for continuously receiving molten metal discharged through the melting furnace outlet 25. Molten metal is discharged continuously through the oxidizer outlet 36 simultaneously with the oxidizer inlet's continuously receiving the molten metal discharged through the melting furnace outlet 25. Molten metal is discharged from the oxidizer vessel outlet into the reducer 50, which has a chemically reducing environment. The reducer inlet 51 continuously receives the molten metal discharged through the oxidizer outlet 36. Molten metal is continuously discharged through the reducer outlet 54 simultaneously with the reducer inlet's continuously receiving the molten metal discharged through the oxidizer outlet 36. Molten metal is discharged through the reducer outlet 54 into the finisher 70 via the finisher inlet 71. Molten metal is continuously discharged through the finisher outlet 73 simultaneously with the finisher inlet's continuously receiving the molten metal discharged through the reducer outlet 54.

Shut-down of the system begins with halting of the scrap conveyor. The steel level in the melting furnace decreases while steel continues to flow to the subsequent vessels. After the melting furnace is completely drained, the steel level in the oxidizer decreases until its exit channel is emptied. The oxidizer is then lifted, rotated, and tilted by an overhead crane which grasps the vessel at trunnions on its side to completely drain the steel into the reducer through the oxidizer entry launder. This same procedure is repeated for the reducer. The finisher is bottom tapped until completely emptied into the tundish, and the tundish is bottom tapped until completely emptied into the mold.

Maintenance of melting furnace components such as the conveyor repair, electrode additions, apron cleaning, gunning or the like can be performed in process because the melting furnace can be completely drained without tilting. Steel can be continuously transferred to the oxidizer, processed in the refining vessels, and cast without charging any scrap for, for example, up to 30 minutes. During this furnace delay, steel flow in the downstream vessels could be decreased to provide more buffer time, such as up to one hour, for completing the maintenance. If a multiple strand caster is used, selected strands can be temporarily plugged to provide further decrease in production rate, if necessary.

Maintenance of the oxidizer, reducer, or finisher can be performed by decreasing flow rate in the other vessels. Steel flow in the problem vessel can be stopped while the maintenance is performed for, for example, up to 15 minutes. For example, a slag line in one of the refining vessels can be gunned while the steel level is lowered. Each of the oxidizer, reducer, and finisher sits on a car that resembles a ladle car in traditional operations. The unit can be moved to the side and replaced with a pre-heated spare vessel if a longer delay is anticipated. Flow through upstream vessels is temporarily halted during the change of the problem vessel. This type of replacement can also be used to increase the duration of the continuous process by performing maintenance on one vessel at a time.

For grade changes, alloying is halted in the reducer for alloys that need to be decreased during the grade change while their addition is increased in the finisher, which dilutes the alloy concentration in the reducer while keeping the required composition of the leading grade in the finisher. Superheating is increased in the melting furnace to offset heat losses associated with flow interruptions. After the steel temperature in the melting furnace, oxidizer, and reducer is increased and the required alloy concentrations are decreased to the level of the new grade in the reducer, flow through these three vessels is temporarily stopped, providing a break between grades. Since there is no steel flowing into the reducer, the steel in the reducer is alloyed in a batch manner similar to ladle treatment, preparing the new grade. The steel in the finisher is being drained during this time, representing the end of the leading grade. Once the finisher is drained, the furnace, oxidizer, and reducer are reopened along with flux and alloying addition rates required for the new grade during continuous operation, thus filling the finisher with the new grade. The finisher is then reopened after it is filled and the steel in the tundish is lowered to minimize the amount of intermix material similar to traditional casting operations. Flow resumes at normal steady state after the finisher and the tundish are completely refilled with the new grade. If the steel temperature decreases below the necessary superheat before steady state conditions are re-established with the new grade, the steel can be heated in the reducer, finisher, and tundish with, for example, a non-contact twin plasma torch.

It is alternatively possible to make gradual changes between grades. Currently head-to-tail grade variations in a single slab can be problematic. These variations could be controlled by spreading out the grade change over several slabs, gradually increasing or decreasing the alloying additions. This new procedure could decrease yield losses. In addition, grade changes can be controlled and scheduled to minimize the amount of downgraded intermix material.

For casters of a variety of grades, the ability to change grades in the continuous steelmaking method of the invention has distinct advantages. A caster which casts in, for example, 175 ton heats is currently limited to casting each grade in 175 ton batches. Even if only 100 tons of a particular grade are desired, the caster must make 175 tons of the grade. And if 200 tons of a particular grade are desired, the caster must make two batches, or 350 tons. The continuous steelmaking process does not suffer from these limitations. Quantities of 100 tons, 200 tons, and other quantities can be made, resulting in efficiency, flexibility, and cost savings over current methods.

EXAMPLE 1

Simulations were calculated for steady-state operation conditions during fully continuous production of Si-deoxidized steel using the process model program Metsim (see metsim.com), and the results presented in Table 1. The Free Energy Minimizer (FEM) of Metsim was adjusted based on thermodynamical calculations, using FactSage (see factsage.com).

The simulation was based on a 165-t/hr production rate. The steel and slag masses and compositions of each vessel, as listed in Table 1, are the result of reactions of the incoming steel stream with alloys, fluxes, and air. The extent of these reactions and the composition of the steel and the slag depend on the mass transfer and thermodynamic conditions within each vessel. The mass transfer rate constant (k) was calculated by using the specific steel transport rate, which is a function of argon flow rate, vessel geometry, steel temperature, and pressure. The thermodynamic conditions in each vessel support fast reactions and the removal of impurities. For instance, the de-S rate is increased when less iron oxide is supplied to the bath. Iron oxide sources that include oxidized carry-over slags, oxidized sculls in ladles, slag from previous heats, and iron oxides from ladle cleaning would be minimized due to less emptying, cleaning, and refilling of vessels and because no EAF carry-over slag will enter the reducer.

The steel temperatures were calculated during the simulation based on the effects of additions, chemical reactions, and heat losses to the environment. The heat losses are based on a thermal model of the refining vessels. The current simulation results indicate that the steel only needs to be heated in the EAF during steady-state operations. The steel temperature in the EAF was set to be 2908° F. based on thermal simulations. Steel of this temperature entered the oxidizer where it cooled to 2865° F. before entering the reducer, where it cooled an additional 29° F. The steel that flowed from the finisher into the tundish had a temperature of 2822° F. In general, the heating in the EAF is sufficient because of short processing times, efficient use of fluxes and alloys due to near-equilibrium conditions, elimination of tapping into ladles that are below the steady-state temperatures, smaller refractory surface area in the three refining vessels as compared to three ladles, and additional insulation of the new refining vessels.

Based on modern Consteel operations, it is estimated that the melting and heating of 172 tons of scrap per hour in the EAF requires 320 kWh/t electricity and the injection of oxygen at a rate of 3000 scfm. The steel flow from the EAF into the oxidizer is estimated to be 164 t/hr, assuming a 95% metallic yield in the EAF. The liquid EAF slag has a FeO concentration of 14% and is in close equilibrium with the carbon content of the steel (0.08%) due to steady-state furnace operations. The carbon concentration of the steel in the EAF can be increased as compared to the current EAF-LMF steelmaking route because additional de-C is possible in the oxidizer.

The carbon and phosphorus concentrations are decreased in the oxidizer from 0.08% C to 0.04% C and from 0.010% P to 0.004% P due to the addition of 4 lbs of hematite per ton of steel. The concentrations of both elements are increased in the reducer to 0.06% C and 0.008% P because the ferroalloys contain carbon and phosphorus. The refining conditions change from oxidizing to reducing when the steel flows from the oxidizer into the reducer. The stirring of the steel and the addition of alloys and fluxes causes the de-S of the steel from 0.050% S to 0.015% S in the reducer. Additional de-S from 0.015% S to 0.008% S is achieved in the finisher. Some aluminum reversion was calculated during the refining in the reducer and finisher.

TABLE 1

Example of steady-state operation conditions, flux and alloy additions,
and steel and slag chemistries for producing 165 t/hr

| | | | steel | wt % | additions | lbs/t | slag | liquid wt % | solid wt % | total |
|---|---|---|---|---|---|---|---|---|---|---|
| EAF (vessel 1) | | | | | | | | | | |
| | | | | | high Ca lime | 44 | | | | |
| electricity | 320 | kWh/t | C | 0.08 | dolomitic lime | 44 | CaO | 45 | 1 | 43 |
| oxygen | 3000 | scfm | Mn | 0.20 | Ca-Aluminate | — | $SiO_2$ | 22 | — | 21 |
| scrap | 172 | t/hr | P | 0.010 | bauxite | — | $Al_2O_3$ | 6 | — | 6 |
| capacity | 55 | t | S | 0.050 | hematite | — | MgO | 9 | 76 | 12 |
| temperature | 2908 | °F. | Si | 0 | SiMN | — | MnO | 3 | 6 | 3 |
| totalslag | 160 | lbs/t | Al | 0 | FeSi | — | $FeO_X$ | 14 | 17 | 14 |
| solidslag | 4 | wt % | V | 0 | FeV | — | $P_2O_5$ | 1 | — | 1 |
| | | | | | | | V3 | 1.6 | | 1.6 |
| Oxidizer (vessel 2) | | | | | | | | | | |
| | | | | | High Ca lime | 3.4 | | | | |
| capacity | 27 | t | C | 0.04 | dolomitic lime | 2.7 | CaO | 44 | 1 | 43 |
| flow rate | 164 | t/hr | Mn | 0.17 | Ca-Aluminate | — | $SiO_2$ | 5 | — | 5 |
| temperature | 2865 | °F. | P | 0.004 | Bauxite | 4.1 | $Al_2O_3$ | 22 | — | 22 |
| argon | 17 | scfm | S | 0.050 | hematite | 4.1 | MgO | 9 | 86 | 10 |
| k | 0.27 | $min^{-1}$ | Si | 0 | SiMN | — | MnO | 6 | — | 6 |
| totalslag | 11.6 | lbs/t | Al | 0 | FeSi | — | $FeO_X$ | 12 | 13 | 12 |
| solidslag | 2 | wt % | V | 0 | FeV | — | $P_2O_5$ | 2 | 0 | 2 |
| | | | | | | | V3 | 1.6 | | 1.6 |
| Reducer (vessel 3) | | | | | | | | | | |
| | | | | | high Ca lime | 6.0 | | | | |
| capacity | 27 | t | C | 0.06 | dolomitic lime | 2.0 | CaO | 50 | 20 | 49 |
| flow rate | 165 | t/hr | Mn | 0.90 | Ca-Aluminate | 5.0 | $SiO_2$ | 18 | — | 17 |
| temperature | 2836 | °F. | P | 0.008 | bauxite | — | $Al_2O_3$ | 15 | — | 14 |
| argon | 17 | scfm | S | 0.015 | hematite | — | MgO | 7 | 80 | 11 |
| k | 0.45 | $min^{-1}$ | Si | 0.26 | SiMn | 20.4 | MnO | nil | — | nil |
| totalslag | 15.5 | lbs/t | Al | 0.001 | FeSi | 3.2 | $FeO_X$ | nil | — | nil |
| solidslag | 2 | wt % | V | 0 | FeV | — | sulfides | 10 | — | 9 |
| | | | | | | | B | 2.2 | | 2.5 |
| Finisher (vessel 4) | | | | | | | | | | |
| | | | | | high Ca lime | 1.4 | | | | |
| capacity | 23.5 | t | C | 0.06 | dolomitic lime | — | CaO | 48 | 11 | 47 |
| flow rate | 165 | t/hr | Mn | 0.90 | Ca-Aluminate | 2.4 | $SiO_2$ | 10 | — | 10 |
| temperature | 2822 | °F. | P | 0.008 | bauxite | — | $Al_2O_3$ | 25 | — | 24 |
| argon | 7 | scfm | S | 0.008 | hematite | — | MgO | 9 | 89 | 12 |
| k | 0.17 | $min^{-1}$ | Si | 0.25 | SiMn | — | MnO | nil | — | nil |
| totalslag | 4.0 | lbs/t | Al | 0.003 | FeSi | — | $FeO_X$ | nil | — | nil |
| solidslag | 2 | wt % | V | 0.040 | FeV | 1.0 | other | 8 | — | 7 |
| | | | | | | | B | 2.4 | | 2.6 |

EXAMPLE 2

The simulation of continuous steelmaking operations was modified during five additional runs of the Metsim model. The final carbon, phosphorus, and sulfur concentrations after these runs are summarized in Table 2. The values of simulation 1 in Table 2 represent the results that were discussed in the previous section and they are used as a baseline for the other simulations.

TABLE 2

Final carbon, phosphorus, and sulfur concentrations as calculated during six different steady-state simulations

|  | Simulation | | | | | |
| --- | --- | --- | --- | --- | --- | --- |
| Difference to | 1 | 2 Double | 3 Triple P | 4 | 5 | 6 |
| | | | | Failure of porous plug in the Reducer | | |
| Simulation 1 | Baseline | production rate | Double S | No actions | de-S in Oxdizer | ↑ Ar in Finisher |
| wt % C | 0.06 | 0.07 | 0.06 | 0.06 | 0.10 | 0.06 |
| wt % P | 0.008 | 0.014 | 0.016 | 0.007 | 0.019 | 0.007 |
| wt % S | 0.008 | 0.019 | 0.018 | 0.018 | 0.007 | 0.011 |

In simulation 2, the production rate (scrap and alloy addition rate) was changed from 110 t/hr to 220 t/hr without changing the amounts of flux additions or the values of the mass transfer rate constants. The concentrations of carbon, phosphorus, and sulfur increased during simulation 2 as compared to simulation 1; however, they were within common values after ladle refining of Si-deoxidized steel. It is expected that additional simulations will show that a proportional increase of flux additions and the increase of the argon stirring would make it possible to decrease these concentrations to values similar to simulation 1. The result of simulation 2 indicates that it is possible to continuously vary the production rate during the operation of the continuous steelmaking process.

The effect of an initial impurity concentration increase in the scrap without detection was calculated during simulation 3. The phosphorus and sulfur concentrations of the steel that entered the oxidizer were increased from 0.010% P to 0.030% P and from 0.050% S to 0.100% S without changing other operational conditions of simulation 1. The final sulfur and phosphorus concentration increased. However, they were again within common values after ladle refining of Si-deoxidized steel. This result indicates that final steel chemistry is still within typical steel specifications after undetected P and S increases in the scrap. Once the impurity increase is detected, corrective actions such as an increase in argon flow rate and flux additions can decrease the final P and S to values similar to simulation 1.

A failure of the porous plug in the reducer was investigated during simulation 4. It was assumed that the swirl that is created in the vessel due to the off-center inlet stream would still result in a mass transfer rate constant of 0.05 min$^{-1}$ (down from 0.45 min$^{-1}$ during argon stirring). The simulation was calculated without changing other operational conditions of simulation 1. The final sulfur concentration increased to 0.018%, which is a common value after ladle refining of Si-deoxidized steel. This result indicates that a failure of a porous plug does not necessarily lead to a final steel chemistry that is outside the grade specifications.

Two corrective actions of a porous plug failure in the reducer were investigated during simulations 5 and 6. In simulation 5, the operation of the oxidizer was modified by replacing the oxidizing slag with a reducing slag and making SiMn and FeSi alloys additions in the oxidizer. All other operating conditions were the same as during simulation 4. The final sulfur concentration of simulation 5 was lower than the final sulfur concentration of simulation 1 because some sulfur was removed from the steel in all three refining vessels. The final carbon and phosphorus concentrations increased because these elements were not removed in the oxidizer. Remarkably, the steel chemistry in the oxidizer during simulation 5 (0.10% C, 0.019% P, 0.018% S) was similar to the final steel composition after ladle refining of Si-deoxidized steel. This result indicates that the steel treatment in only one of the three refining vessels can achieve similar refining to current ladle treatment.

Simulation 6 was similar to simulation 4 with the exception that the gas flow rate and the flux additions were increased in the finisher, raising the mass transfer rate constant in this vessel. This change decreased the final sulfur concentration from 0.018% S (simulation 4) to 0.011% S while the final carbon and phosphorus concentrations were as low as after simulation 1. The increase of the argon flow rate in the finisher has the potential to increase the inclusions in the final product due to increased turbulence and slag entrapment. Other corrective actions would also be possible. For instance, the melt-shop crew could have chosen to exchange the reducer on the fly after the porous plug failed.

When introducing elements of the present invention or the preferred embodiment(s) thereof, the articles "a," "an," "the," and "said" are intended to mean that there are one or more of the elements. For example, that the foregoing description and following claims refer to "an" interconnect means that there are one or more such interconnects. The terms "comprising," "including," and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense. The scope of invention is defined by the appended claims and modifications to the embodiments above may be made that do not depart from the scope of the invention.

The invention claimed is:

1. An apparatus for continuous refining of steel comprising:
   a melting furnace for melting iron-bearing material, the furnace comprising a heat source, a melting furnace inlet for continuously receiving the iron-bearing material, a melting vessel in communication with said inlet for melting the iron-bearing material and holding molten steel, and a melting furnace outlet for discharging the molten steel continuously from the melting vessel simultaneously with the melting furnace inlet's continuously receiving the iron-bearing material;
   an oxidizer having a chemically oxidizing environment for oxidizing oxidizable elements in the molten steel including decarburization and dephosphorization, and comprising an oxidizer inlet in direct communication with the melting furnace outlet for continuously receiving the molten steel discharged from the melting furnace outlet, an oxidizing vessel in communication with the oxidizer inlet for holding the molten steel, and an oxidizer outlet for continuously discharging the molten steel from the oxidizer simultaneously with the oxidizer inlet's continuously receiving the molten steel discharged from the melting furnace outlet; and a reducer for deoxidizing and desulfurizing the molten steel, the reducer having a chemically reducing environment and comprising a reducer inlet in direct communication with the oxidizer outlet for continuously receiving the molten steel discharged from the oxidizer outlet, a reducer vessel in communication with the reducer inlet for holding the molten steel, and a reducer outlet for continuously discharging the molten steel from the reducer simultaneously with the reducer inlet's continuously receiving the molten steel discharged from the oxidizer outlet of the oxidizer having the inlet for receiving the molten steel discharged from the melting furnace outlet.

2. The apparatus of claim 1 wherein the melting furnace is an electric arc furnace.

3. The apparatus of claim 1 further comprising a finisher for alloying elements into and refining the molten steel, the finisher comprising a finisher inlet for continuously receiving the molten steel discharged from the reducer outlet, a finisher vessel in communication with the finisher inlet for holding the molten steel during the alloying, and a finisher outlet for continuously discharging the molten steel from the finisher simultaneously with the finisher inlet's continuously receiving the molten steel from the reducer outlet.

4. The apparatus of claim 3 wherein the melting furnace is an electric arc furnace.

5. The apparatus of claim 4 wherein the reducer vessel has a conical shape which tapers from a larger diameter at a top edge of the reducer vessel to a smaller diameter at a bottom edge of the reducer vessel.

6. The apparatus of claim 5 wherein the oxidizer vessel and the finisher vessel have a cylindrical shape.

7. The apparatus of claim 3 further comprising:
an oxidizer inlet chute at the oxidizer inlet for continuously removing slag from the oxidizer;
a reducer inlet chute at the reducer inlet for continuously removing slag from the reducer; and
a finisher inlet chute at the finisher inlet for continuously removing slag from the finisher.

8. A process for continuous refining of steel comprising:
continuously feeding iron-bearing material into a melting furnace and melting the iron-bearing material therein, wherein the melting furnace comprises a heat source, a melting furnace inlet for continuously receiving the iron-bearing material, a melting vessel in communication with said inlet for melting the iron-bearing material and holding molten steel, and a melting furnace outlet;
discharging the molten steel continuously through the melting vessel outlet simultaneously with the melting furnace inlet's continuously receiving the iron-bearing material;
continuously receiving the molten steel discharged through the melting vessel outlet into an oxidizer for oxidizing oxidizable elements in the molten steel including decarburization and dephosphorization, the oxidizer having a chemically oxidizing environment and comprising an oxidizer inlet in direct communication with the melting furnace outlet for the continuously receiving the molten steel discharged through the melting furnace outlet, an oxidizing vessel in communication with the oxidizer inlet for holding the molten steel, and an oxidizer outlet;
oxidizing oxidizable elements in the molten steel in the oxidizer vessel;

discharging the molten steel continuously through the oxidizer vessel outlet simultaneously with the oxidizer inlet's continuously receiving the molten steel discharged through the melting furnace outlet;

continuously receiving the molten steel discharged from the oxidizer vessel outlet into a reducer for deoxidizing and desulfurizing the molten steel, the reducer having a chemically reducing environment and comprising a reducer inlet in direct communication with the oxidizer outlet for continuously receiving the molten steel discharged through the oxidizer outlet, a reducing vessel in communication with the reducer inlet for holding the molten steel, and a reducer outlet; and discharging the molten steel continuously through the reducer vessel outlet simultaneously with the reducer inlet's continuously receiving the molten steel discharged through the oxidizer outlet.

9. The process of claim 8 further comprising:
continuously receiving the molten steel discharged through the reducer vessel outlet into a finisher for alloying and refining the molten steel, the finisher comprising a finisher inlet for continuously receiving the molten steel discharged from the reducer outlet, a finisher vessel in communication with the finisher inlet for holding the molten steel, and a finisher outlet; and
continuously discharging the molten steel through the finisher outlet simultaneously with the finisher inlet's continuously receiving the molten steel through the reducer outlet.

10. The process of claim 9 wherein the melting furnace is an electric arc furnace.

11. The process of claim 10 wherein the reducer vessel has a conical shape which tapers from a larger diameter at a top edge of the reducer vessel to a smaller diameter at a bottom edge of the reducer vessel.

12. The process of claim 11 wherein the oxidizer vessel and the finisher vessel each has a cylindrical shape.

13. The process of claim 10 further comprising feeding flux into the melting furnace, into the oxidizer, and into the reducer.

14. The process of claim 13 further comprising feeding alloying elements into the finisher.

15. The process of claim 13 further comprising feeding alloying elements into the reducer and into the finisher.

16. The process of claim 13 further comprising continuously removing slag from the oxidizer vessel at the oxidizer inlet.

17. The process of claim 13 further comprising continuously removing slag from the reducer vessel at the reducer inlet.

18. The process of claim 13 further comprising continuously removing slag from the finisher vessel at the finisher inlet.

19. The process of claim 13 further comprising continuously removing slag from the oxidizer vessel at the oxidizer inlet, continuously removing slag from the reducer vessel at the reducer inlet, and continuously removing slag from the finisher vessel at the finisher inlet.

20. The process of claim 9 wherein the reducer vessel has a conical shape which tapers from a larger diameter at a top edge of the reducer vessel to a smaller diameter at a bottom edge of the reducer vessel.

21. A process for continuous refining of steel comprising:
continuously feeding iron-bearing material having an oxygen content below about 0.5% and flux into an electric arc melting furnace and melting the iron-bearing material therein, wherein the melting furnace comprises a heat source, a melting furnace inlet for continuously receiving the iron-bearing material, a melting vessel in communication with said inlet for melting the iron-bearing material and holding molten steel, and a melting furnace outlet;

discharging the molten steel continuously through the melting vessel outlet simultaneously with the melting furnace inlet's continuously receiving the iron-bearing material;

continuously receiving the molten steel discharged through the melting vessel outlet into an oxidizer having a chemically oxidizing environment for oxidizing oxidizable elements in the molten steel including decarburization and dephosphorization, and comprising an oxidizer inlet in direct communication with the melting furnace outlet for the continuously receiving the molten steel discharged through the melting furnace outlet, an oxidizing vessel in communication with the oxidizer inlet for holding the molten steel, and an oxidizer outlet;

oxidizing oxidizable elements in the molten steel in the oxidizer vessel;

discharging the molten steel continuously through the oxidizer vessel outlet simultaneously with the oxidizer inlet's continuously receiving the molten steel discharged through the melting furnace outlet;

continuously receiving the molten steel discharged from the oxidizer vessel outlet into a reducer for deoxidizing and desulfurizing the molten steel, the reducer having a chemically reducing environment and comprising a reducer inlet in direct communication with the oxidizer outlet for continuously receiving the molten steel discharged through the oxidizer outlet, a reducing vessel in communication with the reducer inlet for holding the molten steel, and a reducer outlet;

discharging the molten steel continuously through the reducer vessel outlet simultaneously with the reducer inlet's continuously receiving the molten steel discharged through the oxidizer outlet;

continuously receiving the molten steel discharged through the reducer vessel outlet into a finisher for alloying the molten steel, the finisher comprising a finisher inlet in direct communication with the reducer outlet for continuously receiving the molten steel discharged from the reducer outlet, a finisher vessel in communication with the finisher inlet for holding the molten steel, and a finisher outlet;

continuously discharging the molten steel through the finisher outlet simultaneously with the finisher inlet's continuously receiving the molten steel through the reducer outlet;

feeding flux into the electric arc melting furnace, oxidizer, reducer, and finisher and feeding alloying elements into the finisher; and continuously removing slag from the oxidizer vessel at the oxidizer inlet, continuously removing slag from the reducer vessel at the reducer inlet, and continuously removing slag from the finisher vessel at the finisher inlet.

22. The process of claim 21 wherein the continuously discharging the molten steel from the finisher outlet comprising continuously discharging said molten steel to a tundish of a continuous caster.

23. The process of claim 22 further comprising continuously removing slag from the oxidizer at the oxidizer inlet by the oxidizer inlet chute; continuously removing slag from the reducer at the reducer inlet by a reducer inlet chute; and continuously removing slag from the finisher at the finisher inlet by a finisher inlet chute.

* * * * *

UNITED STATES PATENT AND TRADEMARK OFFICE
CERTIFICATE OF CORRECTION

PATENT NO. : 7,618,582 B2                                      Page 1 of 1
APPLICATION NO. : 11/381820
DATED           : November 17, 2009
INVENTOR(S)     : Peaslee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 552 days.

Signed and Sealed this

Ninth Day of November, 2010

David J. Kappos
*Director of the United States Patent and Trademark Office*